No. 864,065. PATENTED AUG. 20, 1907.
C. H. BENNETT.
GREEN CORN HUSKER.
APPLICATION FILED MAR. 22, 1907.

2 SHEETS—SHEET 1.

WITNESSES
Edward Thorpe

INVENTOR
Charles H. Bennett
BY Munn & Co
ATTORNEYS

No. 864,065. PATENTED AUG. 20, 1907.
C. H. BENNETT.
GREEN CORN HUSKER.
APPLICATION FILED MAR. 22, 1907.
2 SHEETS—SHEET 2.
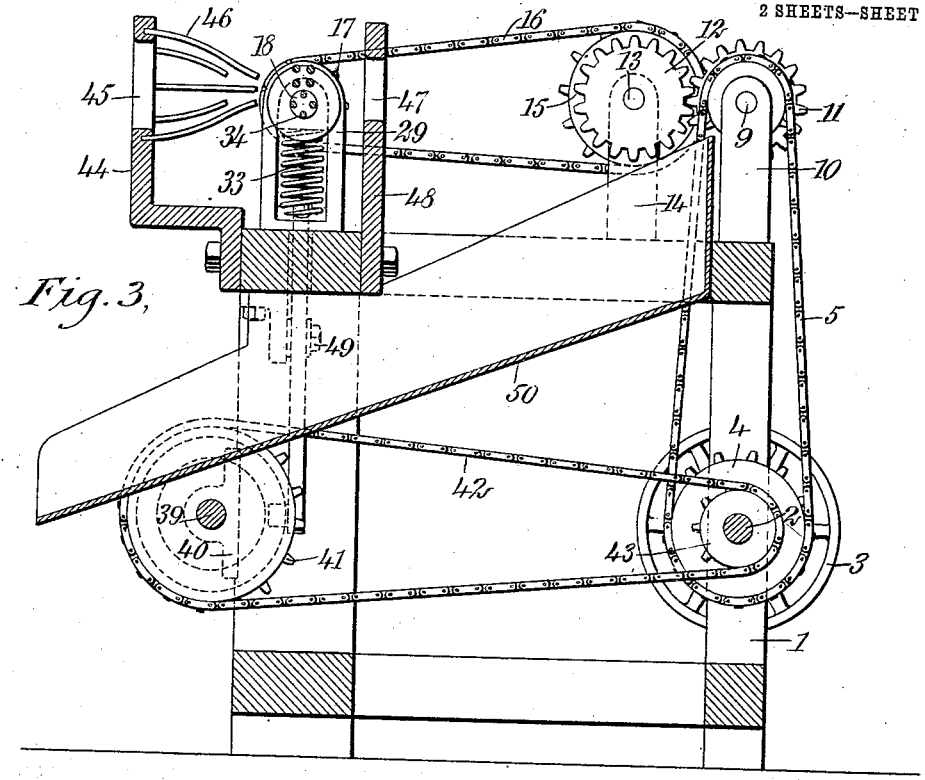
Fig. 3.
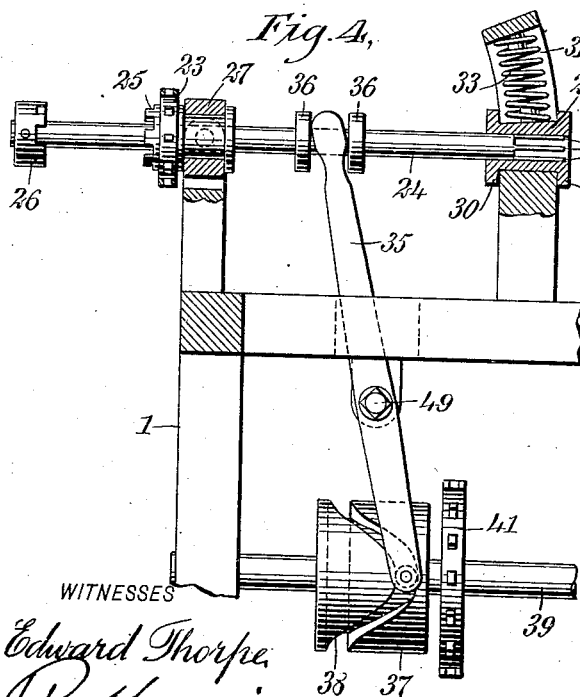
Fig. 4.
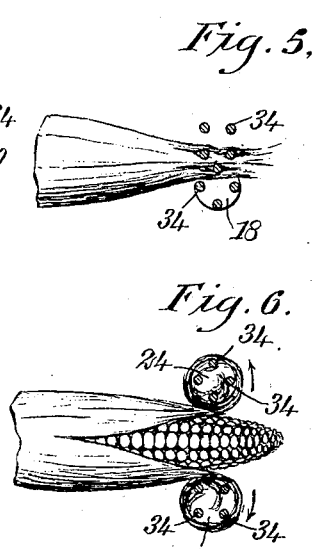
Fig. 5.
Fig. 6.
WITNESSES
Edward Thorpe
P. W. Hardie
INVENTOR
Charles H. Bennett
BY Munn & Co
ATTORNEYS

UNITED STATES PATENT OFFICE.

CHARLES HARRISON BENNETT, OF MOUNT MORRIS, NEW YORK.

GREEN-CORN HUSKER.

No. 864,065.　　　Specification of Letters Patent.　　　Patented Aug. 20, 1907.

Application filed March 22, 1907. Serial No. 363,794.

*To all whom it may concern:*

Be it known that I, CHARLES HARRISON BENNETT, a citizen of the United States, and a resident of Mount Morris, in the county of Livingston and State of New York, have invented a new and Improved Green-Corn Husker, of which the following is a full, clear, and exact description.

This invention has for its object to provide means simple in construction, effective in operation and durable in use, adapted to husk green corn without injury to the ear.

Figure 1:
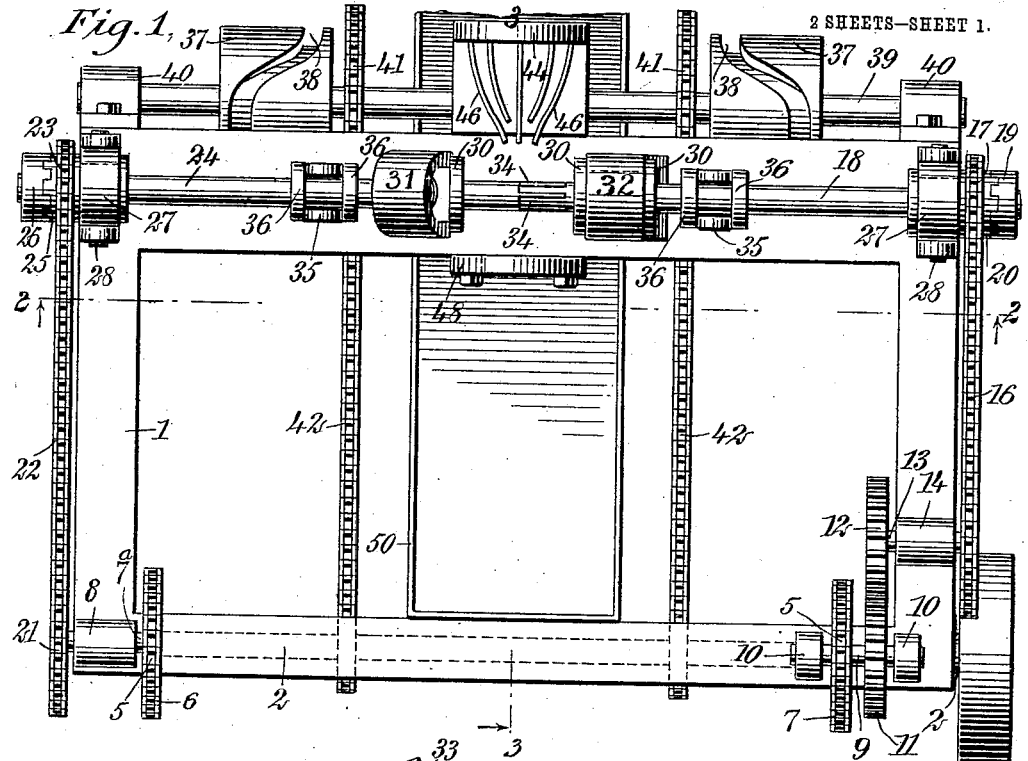
Figure 2:
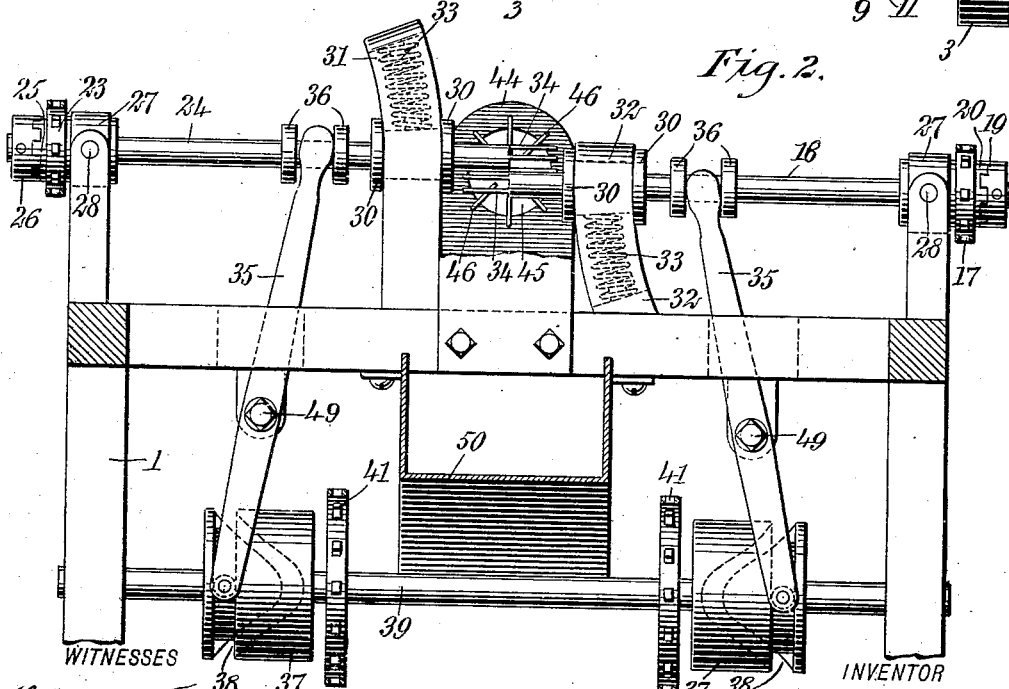

Other objects relating to the specific construction and special arrangement of the different parts of my invention will be understood by the accompanying drawings and following description, in which drawings like characters of reference indicate like parts throughout the views, and in which Figure 1 is a plan of a device embodying my invention; Fig. 2 is a vertical section taken on the line 2—2 of Fig. 1; Fig. 3 is a vertical section taken on the line 3—3 of Fig. 1; Fig. 4 is a sectional elevation of a portion of the device shown in Fig. 2; and Figs. 5 and 6 are sectional details hereinafter more fully described.

As illustrated in the drawings, the operating parts of the device are mounted on a main frame 1, having a driving shaft 2 journaled thereon, and provided on one end with a driving pulley 3. Sprocket wheels 4 are fixedly attached to the driving shaft and connected by means of endless chains 5 with sprocket wheels 6 and 7 mounted upon the upper portion of the main frame, the sprocket wheel 6 being preferably attached to a stud shaft 7ª journaled on the upper end of a standard 8, which may be secured to the main frame in any suitable manner. The sprocket wheel 7 is mounted upon a short shaft 9 journaled in standards 10 attached to the main frame, the shaft 9 being also provided with a gear 11 which meshes with a gear 12 attached to a shaft 13 which is journaled in a suitable standard 14, mounted upon the main frame. The shaft 13 is also provided with a sprocket wheel 15 which supports an endless chain 16 connecting said sprocket wheel with a smaller sprocket wheel 17 fixedly attached to a shaft 18. The outer end of the shaft 18 is provided with a clutch member 19 adapted to engage a corresponding member 20 attached to or formed on the sprocket wheel 17. The shaft 7ª is provided with a sprocket wheel 21 on which is mounted an endless chain 22 which connects said sprocket wheel with a sprocket wheel 23 attached to a shaft 24 mounted upon the main frame, and provided with a clutch member 25 adapted to engage a similar member 26 attached to the outer end of the shaft 24. The shafts 18 and 24 respectively are journaled in bearing boxes 27 which are pivotally secured by means of pins or trunnions 28 in the forked or slotted upper end of standards on the main frame. The inner ends of said shafts are journaled in bearings 29 which are preferably provided with flanges 30 serving to hold said bearings in brackets 31 and 32 respectively attached to the main frame. Springs 33 are arranged within said brackets, and held against the bearings 29 so as to keep said shafts normally in a horizontal position, while the pivotal mounting of the bearing boxes 27 permits the inner ends of said shafts to move in vertical planes. The shafts 18 and 24 respectively have also a bodily longitudinal movement in their bearings, as illustrated in Fig. 4. These shafts are arranged in different planes with their inner ends extending in opposite directions and each is provided on its inner ends with husking fingers 34 adapted to rotate in alternate order with the fingers of the opposite shaft. The shafts 18 and 24 are connected with the upper ends of levers 35 which are preferably forked so as to engage collars 36 attached to the shafts; the lower ends of said levers engage wheels 37 provided with cam grooves 38 and attached to an auxiliary shaft 39 journaled in bearing boxes 40 which are mounted upon the forward portion of the main frame. Sprocket wheels 41 are also attached to the auxiliary shaft 39 and are connected by means of endless chains 42 with smaller sprocket wheels 43 mounted upon the drive shaft 2. A guide frame is attached to the forward end of the machine and comprises preferably a bracket 44, having an aperture 45 adapted to receive an ear of corn, and fingers 46 for the purpose of holding and guiding said ear between the inner ends of the shafts 18 and 24. A guide way 47 is also formed in a bracket 48 for the purpose of holding and supporting the forward end of the ear as it passes between the husking fingers.

When the device is in operation, the drive shaft 2 and endless chains 42 rotate the auxiliary shaft 39 so as to reciprocate the lower ends of the levers 35 by means of the cam grooves 38 of the wheels 37 engaging the ends of said levers. The levers 35 in rocking on their pivotal supports 49 cause an endwise bodily movement of the shafts 18 and 24, drawing the fingers 34 into the bearings 29. While the shafts are so extended outward from each other, the clutch members 19—20 and 25 and 26 are disengaged and the shafts 18 and 24 are at rest. An ear of corn is then placed within the guide way 45 and held by the retaining fingers 46, with the reduced end of the ear in line with the husking fingers. As the rotation of the shaft 39 moves the shafts 18 and 24 inward the husking fingers 34 engage the loose end of the corn husk, as shown in Fig. 5. The shafts 18 and 24 rotate in opposite directions as indicated by the arrows in Fig. 6, and as they rotate they roll the free ends of the corn husks around the fingers 34, thereby drawing the ear of corn away from the retaining lips 46 and projecting the ear into the guide way 47 until the entire husk has been stripped from the ear, when the ear will pass through the guide way 47 and fall onto an inclined chute 50 having its outer end extended in any desired direction so as to deliver the corn into a receptacle of any suitable character. As the ear of corn passes between the ends of the shafts 18 and 24, the inner ends of said shafts are free to separate laterally to compensate for the increased thickness of the ear as it is fed between the shafts, the springs 33 connected with the bearings 29 of the inner ends of the shafts holding the husking fingers to their work and returning the inner ends of said shafts to their normal position after the ear has passed between them. The cam grooves 38 of the wheels 37 are so constructed that after the husk has been stripped from the ear the shafts 18 and 24 are moved bodily longitudinally so as to bring the husking fingers into the bearings 29 of the inner ends of the shaft, the edges of which bearings serve as cleaners to remove the silk and husk from the fingers, leaving the shafts and fingers in position to receive another ear of corn to be husked in the manner already described.

In the construction herein shown and described, I have embodied my invention in its preferred form. I do not desire to be limited to such construction, however, as other mechanism having similar capabilities may be used without departing from my invention.

Having thus described my invention, what I claim as new and desire to secure by Letters Patent is:

1. The combination with a main frame, of a drive shaft, shafts connected with the drive shafts and provided on their inner ends with husking fingers, an auxiliary shaft connected with the drive shaft and provided with wheels having cam grooves therein, and pivoted levers engaging in said grooves at one end, and the first named shafts at their opposite end.

2. The combination with a main frame, of a drive shaft, shafts mounted on their outer ends in pivoted bearings and provided on their inner ends with husking fingers, means for connecting said pivoted shafts with the drive shaft, an auxiliary shaft connected with the drive shaft and provided with cam wheels, and pivoted levers connected with said cam wheels of the auxiliary shaft and the pivoted shafts, adapted to move the pivoted shafts longitudinally in their bearings.

3. The combination with a main frame, of a drive shaft, shafts mounted on pivoted bearings on their outer end and provided on their inner end with husking fingers, guide-ways mounted on the main frame adapted to receive bearings for the inner ends of said pivoted shaft, an auxiliary shaft connected with the drive shaft and provided with wheels having cam grooves therein, and pivoted levers engaging in said grooves at one end and the pivoted shafts at their other end.

4. The combination with a main frame, of a drive shaft, pivoted bearings mounted on the main frame, shafts journaled at their outer ends in said bearings, and having projecting longitudinally from their inner ends husking fingers extending in opposite directions, clutch members provided with sprocket wheels connected with the outer ends of the pivoted shafts, and means for connecting said sprocket wheels with the drive shaft.

5. In a corn husking machine, the combination with a main frame, of pivoted bearings mounted on the main frame, shafts having their outer ends rotatably mounted in said pivoted bearings, and provided on their inner ends with husking fingers, sliding bearings mounted on the main frame and supporting the inner ends of said shaft, a drive shaft, means connected with the drive shaft and the pivoted shafts adapted to rotate said shafts in opposite directions, an auxiliary shaft, and means connected therewith and with the drive shaft adapted to move said pivoted shafts longitudinally in their bearings.

6. The combination with a main frame, of a drive shaft, shafts journaled at their outer ends in pivoted bearings and at their inner ends in sliding bearings, and provided on their inner ends with husking fingers, means for rotating the pivoted shafts in opposite directions and moving them longitudinally in their bearings, and a guide-way arranged in line with said husking fingers.

7. In a machine of the character described, the combination with a main frame, of pivoted bearings mounted thereon, shafts journaled on their outer ends in said bearings, and having their inner ends extending in opposite directions, and provided with husking fingers, and sliding bearings mounted on said frame and supporting the inner ends of said shafts.

8. In a machine of the character described, the combination of a main frame, shafts pivotally mounted on the main frame having their inner ends extending in opposite directions and provided with husking fingers, a drive shaft, an auxiliary shaft connected with the drive shaft and provided with cam wheels, and pivoted levers connected with said cam wheels and the pivoted shafts, adapted to move the last named shafts longitudinally in their bearings.

In testimony whereof I have signed my name to this specification in the presence of two subscribing witnesses.

CHARLES HARRISON BENNETT.

Witnesses:
F. P. MILLS,
ALEX. W. SMITH.